United States Patent Office 2,698,316
Patented Dec. 28, 1954

2,698,316

AMINE DERIVATIVES OF COPOLYMERS OF ALPHA, BETA-UNSATURATED POLYCARBOXYLIC ACIDS

John J. Giammaria, Woodbury, N. J., assignor to Socony-Vacuum Oil Company, Incorporated, a corporation of New York No Drawing. Original application November 14, 1949, Serial No. 127,266. Divided and this application April 3, 1951, Serial No. 219,122

1 Claim. (Cl. 260—78)

This invention relates generally to improved lubricating oil compositions. More particularly, it relates to lubricating oil compositions containing aliphatic amine derivatives of copolymers of alpha, beta-unsaturated polycarboxylic acids or anhydrides with aliphatic vinyl compounds as pour point depressants and viscosity index improvers.

The copolymerization of alpha, beta-unsaturated polycarboxylic acids, or anhydrides, with certain aliphatic vinyl compounds and the reaction of the copolymer products with primary and secondary amines, to form amine derivatives thereof, has been described in the prior art. However, insofar as is known, it has never before been suggested that any of these derivatives are useful as additives for lubricating oils.

We have now found that copolymers produced by copolymerizing an alpha, beta-unsaturated polybasic acid, or anhydride, such as maleic anhydride, with an aliphatic vinyl compound, such as a vinyl ester, vinyl ether, acrylic ester, allyl ether, allyl ester or an alpha olefin, may be reacted with relatively long-chain primary or secondary aliphatic amines to form imide or amide derivatives which are effective as viscosity index improvers and pour point depressants in lubricating oils. It is, therefore, the primary object of this invention to provide improved lubricating oil compositions containing such copolymeramine derivatives. Other and further objects will be apparent from the following detailed description of the invention.

As already indicated, the amine derivatives of the copolymers, as contemplated herein, are prepared by first copolymerizing the alpha, beta-unsaturated polybasic acid, or anhydride, with the aliphatic vinyl compound and then reacting the copolymer product with the primary or secondary aliphatic amine.

The alpha, beta-unsaturated acids contemplated for use herein, include maleic, fumaric, itaconic, citraconic, glutaconic, mesaconic and aconitic acids and their anhydrides, maleic anhydride being particularly preferred because it is the least expensive and because the products obtained by its use are, as a rule, more effective than those obtained with the other acids and anhydrides.

As non-limiting examples of the aliphatic vinyl compounds suitable for use in the polymerization reaction, the following may be mentioned:

(a) Vinyl ethers, such as vinyl ethyl ether, vinyl butyl ether, vinyl octyl ether, vinyl dodecyl ether, vinyl tetradecyl ether, vinyl hexadecyl ether, vinyl octadecyl ether, vinyl ethenyl ether, vinyl octenyl ether, vinyl tetradecenyl ether, vinyl octadecenyl ether;

(b) Vinyl esters, such as vinyl acetate, vinyl butyrate, vinyl caprylate, vinyl caprate, vinyl laurate, vinyl myristate, vinyl palmitate, vinyl stearate;

(c) Acrylic esters, such as ethyl acrylate, propyl acrylate, amyl acrylate, heptyl acrylate, nonyl acrylate, undecyl acrylate, tetradecyl acrylate, hexadecyl acrylate, octadecyl acrylate, ethenyl acrylate, dodecenyl acrylate, octadecenyl acrylate;

(d) Allyl esters, such as allyl acetate, allyl butyrate, allyl caprylate, allyl caprate, allyl laurate, allyl myristate, allyl palmitate, allyl stearate;

(e) Allyl ethers, such as allyl ethyl ether, allyl octyl ether, allyl dodecyl ether, allyl tetradecyl ether, allyl hexadecyl ether, allyl octadecyl ether, allyl ethenyl ether, allyl octenyl ether, allyl tetradecenyl ether, allyl octadecenyl ether;

(f) Cycloaliphatic vinyl compounds, such as vinyl cyclohexene;

(g) Heterocyclic vinyl compounds, such as vinyl pyridine and dihydropyrane; and (h) Alpha-olefins, such as ethylene, propylene, butene-1, octene-1, dodecene-1, tetradecene-1, hexadecene-1 and heptadecene-1.

The copolymerization reaction is conducted under ordinary polymerizing conditions. Thus, the reactants may be heated together, either in bulk, or in the presence of a suitable solvent, such as benzene, toluene, xylene, acetone, dioxane or carbon tetrachloride, at temperatures ranging from about 50° C. to about 150° C. A polymerization catalyst of the peroxide type, such as benzoyl peroxide, is preferably used. The reaction time varies from about 15 minutes to about 10 hours, although generally the reaction is complete in from about 1 to about 5 hours.

The preferred copolymers for the purpose of this invention are obtained by reacting the monomers in substantially equimolar quantities.

The exact compositions of the copolymer products are not known. However, the molecular weights of the copolymers may be varied by varying the nature and amounts of catalyst used, the temperature, reaction time, or the solvent. The preferred conditions in these respects are illustrated in the examples given hereinafter, but it is to be understood that they can be varied to a considerable extent within the scope of this invention without making the products ineffective for the intended purpose. In general it is desirable that the copolymer have a fairly high molecular weight, as this appears to increase its effectiveness, especially when the intended purpose is as a viscosity index improver.

The aliphatic amines suitable for reaction with the above-described copolymers are the primary and secondary saturated aliphatic amines having from about 12 to about 18 carbon atoms, or a mixture of such amines containing from 8 to 18 carbon atoms and an average of from 12 to 14 carbon atoms per molecule. Typical of such amine reactants are dodecyl amine, tridecyl amine, tetradecyl amine, heptadecyl amine, hexadecyl amine, dioctyl amine, heptadecyl amine, octadecyl amine and dioctadecyl amine. Amines of the character useful in the invention are marketed by Armour and Co. under the "Armeen" trade name. These include:

"Armeen CD" (a mixture of $C_8$ to $C_{18}$ primary amines having an average of approximately 12 carbon atoms per molecule)
"Armeen 12D" (n-dodecylamine)
"Armeen 14D" (n-tetradecylamine)
"Armeen 16D" (n-hexadecylamine) and
"Armeen 18D" (n-octadecylamine).

The copolymers may be reacted with one or two moles of the aliphatic primary or secondary amine per mole of unsaturated polybasic acid or anhydride in the copolymer. Thus, with the primary amine, either the imide or the diamide, or a mixture of the two, may be formed. However, with the secondary amine, only the amide is formed, either the monoamide or diamide depending upon the molar proportion used.

The reaction between the copolymer and the aliphatic amine is conducted simply by heating the reactants together at moderate temperatures, i. e. from about 100° C. up to about 200° C., until the reaction is complete. Generally, a solvent such as xylene, dioxane or the like is used, the temperature of the reaction being the reflux temperature of the reaction mixture. The reaction is generally completed in from 1 to about 5 hours. The water of reaction is removed as the reaction proceeds by suitable means, such as a Dean-Stark trap. When the reaction is completed, the solvent and unreacted amine are removed by distillation.

We have found that the effects provided by the copolymer-amine derivatives in oil vary depending upon the chain length of the primary or secondary amine used. For example, when the amine contains 12 carbon atoms, the resulting product is oil-soluble but shows no effect as a pour point depressant, although it is effective as a viscosity index improver. However, when the amine contains 14 to 18 carbon atoms, the resulting product also functions as a pour point depressant. On the other hand, the use of a mixture of amines containing 8 to 18 carbon atoms and having an average of about 12 carbon atoms per molecule, such as "Armeen CD," also results in a product which functions both as a viscosity index improver and as a pour point depressant.

The following examples and results of tests will serve to illustrate more clearly the preparation and utility of the materials contemplated herein.

EXAMPLE I

*"Armeen CD" derivative of maleic anhydride-vinyl acetate copolymer*

A copolymer of maleic anhydride and vinyl acetate was prepared by reacting equimolar quantities of maleic anhydride and vinyl acetate in benzene solution using 0.25% benzoyl peroxide as catalyst.

Ten grams of this copolymer were suspended in 175 cc. of toluene and 22.0 grams of "Armeen CD" (a mixture of $C_8$ to $C_{18}$ primary aliphatic amines having an average of approximately 12 carbon atoms per molecule) were added. The mixture was heated at reflux for 1 hour, the water of reaction being removed by means of a Dean-Stark moisture trap. The toluene was then gradually distilled from the reaction mixture and replaced with Sovasol 74, a high-boiling petroleum solvent. The temperature was raised to 140° C. and held about 2 hours. The solvent and unreacted amine were then distilled by heating to 150° C. at 1 mm.

EXAMPLE II

*"Armeen 14D" derivative of maleic anhydride-vinyl acetate copolymer*

Ten grams of the vinyl acetate-maleic anhydride copolymer described in Example I were suspended in 200 cc. of xylene and 100 cc. of toluene and 21.0 grams of "Armeen 14D" (a relatively pure n-tetradecylamine) were added. The mixture was heated at reflux (125° C.) for 2½ hours, the water of reaction being separated as previously described. The solvent was gradually distilled from the reaction mixture and the temperature raised to 150° C. The residue was cooled, diluted with benzene and the solution was vacuum filtered. The solvent was then removed by distillation. The residue was finally extracted with hot methyl alcohol to remove unreacted amine.

EXAMPLE III

*"Armeen 16D" derivative of maleic anhydride-vinyl acetate copolymer*

Four and two-tenths grams of the vinyl acetate-maleic anhydride copolymer described in Example I were suspended in 100 cc. of xylene and 12.0 grams of "Armeen 16D" (a relatively pure n-hexadecylamine) were added. The action mixture was heated at 150° C. for 1 hour, the water of reaction being separated as previously described. Xylene was then distilled from the reaction mixture and the temperature raised to 200° C. After heating at this temperature for 1 hour, the mixture was transferred to a distilling flask and heated to 260° C. at 1 mm. to remove unreacted amine.

EXAMPLE IV

*"Armeen 18D" derivative of maleic anhydride-vinyl acetate copolymer*

Ten grams of the vinyl acetate-maleic anhydride copolymer described in Example I were suppended in 200 cc. of xylene and 150 cc. of toluene and 27.0 grams of "Armeen 18D" (a relatively pure n-octadecylamine) were added. The mixture was treated as described in Example II.

EXAMPLE V

*"Armeen 14D" derivative of maleic anhydride-vinyl Butyl ether copolymer*

A copolymer of maleic anhydride and vinyl butyl ether was prepared by reacting equimolar quantities of monomers in the presence of 1.0% by weight of benzoyl peroxide and using a high boiling, highly aromatic petroleum fraction (Sovasol 74) as solvent.

Ten grams of this copolymer, 20.0 grams of "Armeen 14D" and 200 cc. of xylene were mixed and treated as described in Example III.

EXAMPLE VI

*"Armeen 18D" derivative of maleic anhydride-octene-1 copolymer*

A copolymer of maleic anhydride and octene-1 was prepared by heating equimolar quantities of monomers in xylene at 120–140° C. for 7 hours using 4.0% by weight of benzoyl peroxide.

Ten and one-half grams of this copolymer, 27.0 grams of "Armeen 18D" and 100 cc. of xylene were mixed and heated at reflux for 3 hours, the water of reaction being separated as previously described. The solvent was then gradually distilled from the reaction mixture raising the temperature to 200° C. The residue was purified as described in Example II.

EXAMPLE VII

*Dioctadecyl amine derivative of maleic anhydride-vinyl acetate copolymer*

Ten grams of the vinyl acetate-maleic anhydride copolymer described in Example I, 25.0 grams of dioctadecylamine, 200 cc. of xylene and 100 cc. of toluene were mixed and treated as described in Example II.

EXAMPLE VIII

*Dioctadecyl amine derivative of maleic anhydride-vinyl butyl ether copolymer*

Ten grams of the copolymer described in Example V, 28.0 grams of dioctadecyl amine and 100 cc. of xylene were mixed and heated to reflux. Xylene was gradually distilled from the reaction mixture, thereby raising the reaction temperature to 200° C. After heating at this temperature for 1½ hours, the product was cooled and purified as described in Example II.

EXAMPLE IX

*Dioctadecyl amine derivative of maleic anhydride-octene-1 copolymer*

Ten and one-half grams of the maleic anhydride-octene-1 copolymer described in Example VI, 26.0 grams of dioctadecyl amine and 100 cc. of xylene were mixed and treated as described in Example VII.

POUR POINT DEPRESSION

The data in Table I illustrate the effectiveness of the products contemplated herein as pour point depressants. The pour depressant effect of these products varies appreciably from oil to oil as indicated by the data, which show the results obtained in two oils. Oil A is a Duo-sol refined, Mid-Continent type oil of S. A. E. 30 grade having a Saybolt Universal Viscosity of 67 sec. @ 210° F. and an A. S. T. M. pour point of +20° F. Oil B is a furfural refined S. A. E. 10 grade oil derived from Rodessa crude and having a Saybolt Universal Viscosity of 45.2 sec. at 210° F. and an A. S. T. M. pour point of +20° F.

*Table I*

| Product Blended in Oil | Concn., Wt. Percent | A. S. T. M. Pour Point, ° F. | |
|---|---|---|---|
| | | In Oil A | In Oil B |
| Example I | 0.25 | +20 | 0 |
| Example II | 0.25 | −5 | −5 |
| Example III | 0.25 | −5 | +20 |
| Example IV | 0.25 | +15 | +20 |
| Example V | 0.25 | +20 | −5 |
| Example VI | 0.25 | −15 | +20 |
| Example VII | 0.25 | −10 | +20 |
| Example VIII | 0.25 | −5 | +20 |
| Example IX | 0.25 | −30 | +5 |

V. I. IMPROVEMENT

The effectiveness of the products of this invention as viscosity index improvers is illustrated by the data in Table II. The results were obtained in an acid-refined, Mid-Continent type oil stock having an original viscosity index of 81.1.

Table II

| Product Blended in Oil | Concn., Wt. Percent | Kin. Vis. @ 100° F. | Kin. Vis. @ 210° F. | Viscosity Index |
|---|---|---|---|---|
| None | | 30.52 | 4.84 | 81.1 |
| Example I | 2.0 | 31.76 | 4.98 | 84.4 |
| Example IX | 2.0 | 32.44 | 5.08 | 83.2 |

The proportions of the copolymer-amine product to be incorporated in a lubricating oil will vary with the oil and with the desired improvement. Thus, concentrations of from about 0.01 to about 10% may be used, although the desired results are generally obtained with concentrations of from 0.01 to 2.0%.

Instead of placing the products of this invention directly in the lubricating oil in which they are to be finally used, they may be marketed as concentrates in mineral lubricating oil bases, such concentrates containing, say, 10% to 50%, or more, of the additive.

It is to be understood that the additive products of this invention may be blended in lubricating oils containing other additives such as other types of pour point depressants and viscosity index improvers, anti-rust agents, detergents, antioxidants, anti-foam agents, etc.

Although the principles of this invention have been illustrated herein by means of certain specific examples and tests, it is not intended that the scope of the invention be limited thereby, but only as indicated in the following claim.

This application is a division of application Serial No. 127,266 filed November 14, 1949, now abandoned.

I claim:

As a pour point depressant for mineral lubricating oils, a composition produced by reacting a heteropolymer of maleic anhydride and vinyl acetate with a material consisting essentially of tetradecyl amine.

References Cited in the file of this patent

UNITED STATES PATENTS

| Number | Name | Date |
|---|---|---|
| 2,047,398 | Voss | July 14, 1936 |
| 2,370,943 | Dietrich | Mar. 6, 1945 |
| 2,415,400 | Armstrong | Feb. 11, 1947 |
| 2,454,284 | Kirk | Nov. 23, 1948 |
| 2,456,177 | Cuprey | Dec. 14, 1948 |
| 2,490,677 | Cuprey | Dec. 6, 1949 |
| 2,533,376 | Jones | Dec. 12, 1950 |
| 2,615,845 | Lippincott et al. | Oct. 28, 1952 |